(12) United States Patent
Sorensen

(10) Patent No.: US 11,042,887 B2
(45) Date of Patent: Jun. 22, 2021

(54) PRODUCT EXPOSURE ANALYSIS IN A SHOPPING ENVIRONMENT

(71) Applicant: Shopper Scientist LLC, Corbett, OR (US)

(72) Inventor: Herb Sorensen, Corbett, OR (US)

(73) Assignee: SHOPPER SCIENTIST LLC, Corbett, OR (US)

( * ) Notice: Subject to any disclaimer, the term of this patent is extended or adjusted under 35 U.S.C. 154(b) by 640 days.

(21) Appl. No.: 14/473,954

(22) Filed: Aug. 29, 2014

(65) Prior Publication Data
US 2016/0063517 A1    Mar. 3, 2016

(51) Int. Cl.
*G06Q 30/02* (2012.01)
(52) U.S. Cl.
CPC .............................. *G06Q 30/0201* (2013.01)
(58) Field of Classification Search
CPC ................. G06Q 30/0201; G06Q 30/0643
See application file for complete search history.

(56) References Cited

U.S. PATENT DOCUMENTS

| | | | | |
|---|---|---|---|---|
| 2002/0178085 A1* | 11/2002 | Sorensen | ........... | G06Q 30/0201 705/7.29 |
| 2005/0197923 A1* | 9/2005 | Kilner | ................ | G06Q 30/0201 382/118 |
| 2008/0043013 A1* | 2/2008 | Gruttadauria | .......... | G06Q 30/02 345/419 |
| 2008/0215462 A1* | 9/2008 | Sorensen | ........... | G06K 9/00771 705/28 |
| 2008/0306756 A1* | 12/2008 | Sorensen | ................ | G06Q 30/02 705/27.1 |
| 2012/0139832 A1* | 6/2012 | Hu | ..................... | G06K 9/00268 345/156 |

* cited by examiner

*Primary Examiner* — Akosua Kyereme-Tuah
(74) *Attorney, Agent, or Firm* — Alleman Hall Creasman & Tuttle LLP

(57) ABSTRACT

Systems and methods for analyzing product exposure to one or more shoppers in a shopping environment are disclosed herein. One method may include developing a three-dimensional model of the shopping environment indicating a product location of each of a plurality of products, capturing a plurality of images of shoppers using an overhead camera, and computing an estimated field of view of each shopper captured in the plurality of images. Computer vision techniques may be used to determine a location of a facial feature in the plurality of images, determine a head pose, and then assign the estimated field of view. The method may further include, based on the three-dimensional model, computing that a product location exists within the estimated field of view for each shopper, and generating a visibility metric based on an extent to which the product location exists within each estimated field of view.

14 Claims, 7 Drawing Sheets

PRODUCT EXPOSURE ANALYSIS IN A SHOPPING ENVIRONMENT

BACKGROUND

Consumers make purchases from among a vast assortment of products in various shopping environments. In order to more effectively market their products to the consumers, thereby increasing sales, it may be beneficial for retailers and manufacturers of these products to obtain accurate information related to their customers' shopping habits.

One common method for procuring marketing data on shopper habits is to give customers a survey to fill out. However, the accuracy of the data depends on the responses given by the shoppers, which may be inaccurate due to lack of understanding, laziness, poor memory, or even outright deceit. Therefore, marketing strategies based on such inaccurate data may be unsuccessful, or worse, counterproductive. Alternatively, tracking a shopper's location throughout the shopping environment and assuming a field of view based on the direction of travel may provide inaccurate data because shoppers often turn their head from side to side while browsing products. Further, using a camera to be coupled to the shopper's head to thereby accurately determine which products are within sight of the shopper may limit the amount of data obtainable due to equipment requirements. Moreover, head mounted cameras require the active participation of shoppers, which may be difficult to obtain because such cameras are somewhat obtrusive to wear. In any event, participation of 100% of the shoppers in a store is unrealistic for head mounted cameras. Finally, head mounted cameras suffer from the drawback that they are expensive to purchase and operate.

In view of the above, it would be desirable to provide a system and method for inexpensively and unobtrusively gathering accurate data concerning the shopping habits of multiple consumers.

SUMMARY

Systems and methods for analyzing product exposure to one or more shoppers in a shopping environment are disclosed herein. One disclosed method may include developing a three-dimensional (3-D) virtual reality model of the shopping environment indicating a product location of each of a plurality of products, capturing a plurality of images of shoppers traveling through the shopping environment using an overhead camera aimed at a shopping region, and computing an estimated field of view of each shopper captured in the plurality of images. The estimated field of view may be computed by using computer vision techniques to determine a location of a facial feature in the plurality of images, indicating a face of the shopper, determine a head pose based on the location of the facial feature, and assign the estimated field of view based on the head pose. The method may include, based on the 3-D virtual reality model, computing that a product location exists within the estimated field of view for each shopper, and generating a visibility metric based on an extent to which the product location exists within each estimated field of view.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
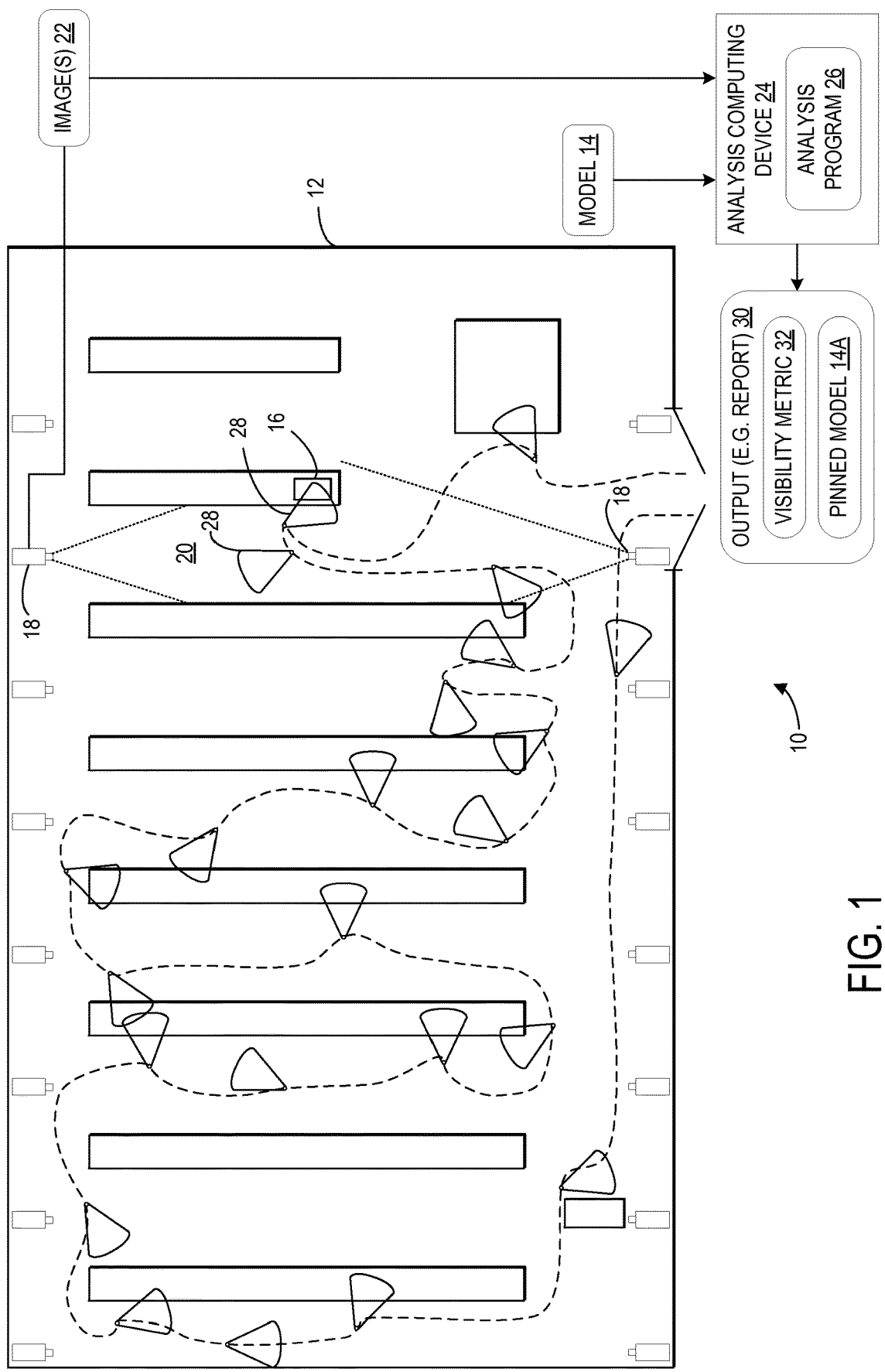
FIG. 1 shows a schematic view of a system for analyzing product exposure to one or more shopper(s) in a shopping environment.

Accordingly, systems and methods for analyzing product exposure to one or more shoppers in a shopping environment are disclosed herein. FIG. 1 shows a schematic view of a system 10 for analyzing product exposure to the one or more shoppers in the shopping environment 12. The system 10 may include a three-dimensional (3-D) virtual reality model 14 of the shopping environment 12 indicating a product location of each of a plurality of products 16, described below with reference to FIG. 3. The system 10 may include at least one overhead camera 18 aimed at a shopping region 20 and configured to capture a plurality of images 22 of shoppers traveling through the shopping environment 12. Typically, a plurality of cameras 18 will already be installed in the shopping environment 12 and may be serviceable. Alternatively, the cameras 18 may be installed for use in the system 10. In one implementation, the shopping environment 12 may be arranged in aisles and a pair of overhead cameras 18 may be arranged opposite each other such that a shopper in an aisle is captured by one or both of the pair of cameras 18. With such an arrangement, the shopper's face may be in view of at least one camera for a majority of a shopping trip, and each camera 18 may confirm data based on the images 22 captured by the other of the pair for higher reliability.

The system 10 may include an analysis computing device 24 configured to receive the images 22 and execute an analysis program 26. The analysis program 26 may be configured to compute an estimated field of view 28 and optionally a point of focus of each shopper captured in the plurality of images 22, then compute that a product location exists within the estimated field of view 28 for each shopper, based on the 3-D virtual reality model 14. The analysis program 26 may be configured to generate an output 30, which may be a report 30, including at least one visibility metric 32 based on an extent to which the product location exists within each estimated field of view 28. The output 30 may further include a pinned model 14A, which is the 3-D model 14 with additional data "pinned" to it. The output 30 may also include shopper density, flow, trip progression, visits/shops/purchases to the shopping region 20, dwell times within the shopping region 20, etc. Obtaining visibility information provided by such outputs may be advantageous because a shopper may be more likely to buy a product if it is visible to the shopper for a longer period of time than other products. Accordingly, a shopper may be less likely to purchase a product not seen by the shopper. Thus, a lesser-exposed product may be repositioned to be seen for longer by more shoppers.

Figure 2:
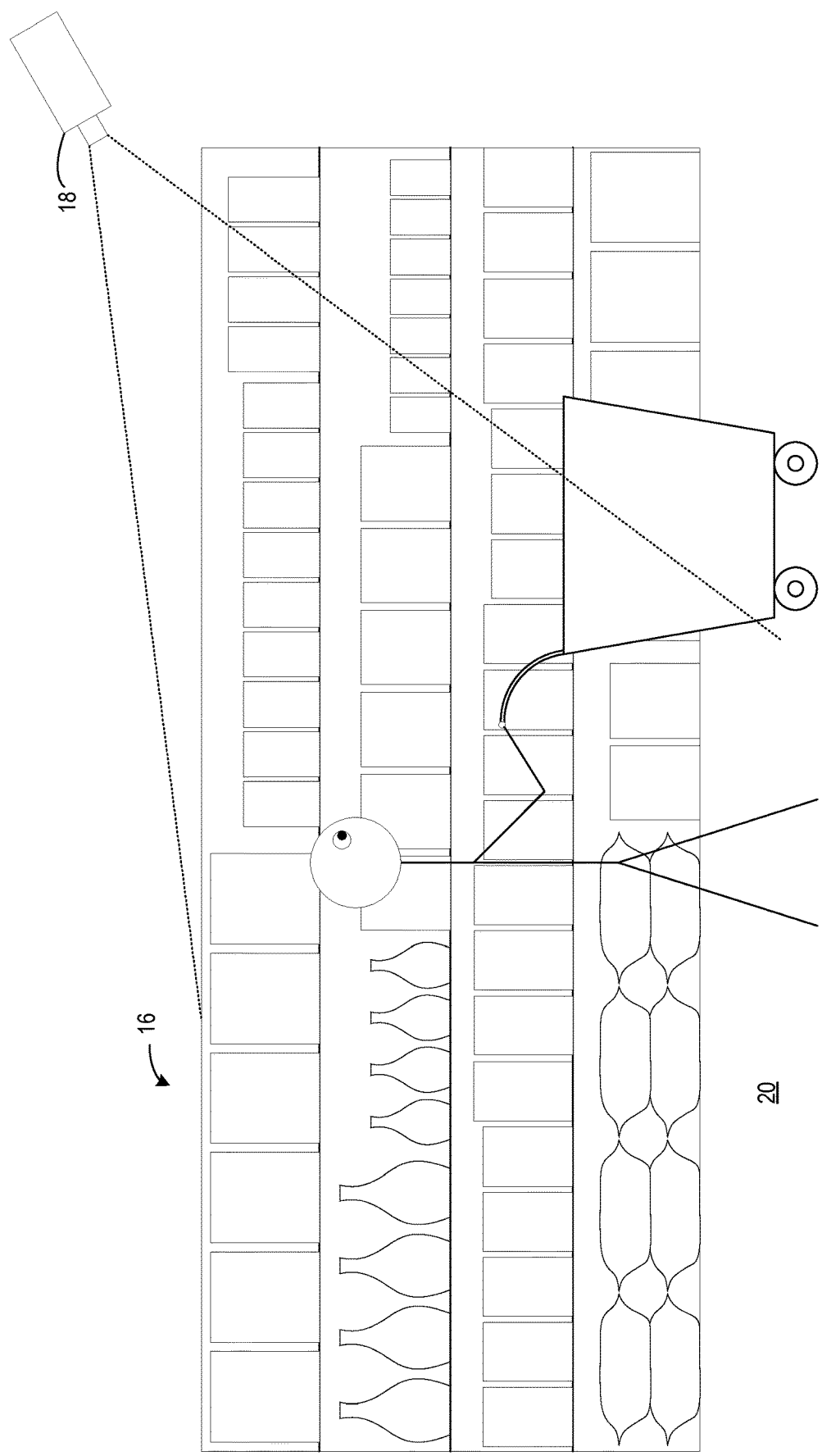
FIG. 2 shows the shopper captured by an overhead camera according to one implementation.

FIG. 2 shows a shopper captured by an overhead camera 18 according to one implementation. In this case, the shopping environment may be a grocery store and products 16 may be arranged on shelves in aisles. One camera 18 is shown but another may be located at the other end of the aisle from the camera 18 according to the arrangement shown in FIG. 1. The shopper may optionally be considered to be making a "visit" to the shopping region 20 by passing by in close proximity. The shopper may make a "shop" by slowing down or stopping in the region 20. Finally, a "purchase" at the region 20 may be confirmed by comparing purchase data from a register, for example, to a product location of the purchased product.

Figure 3:
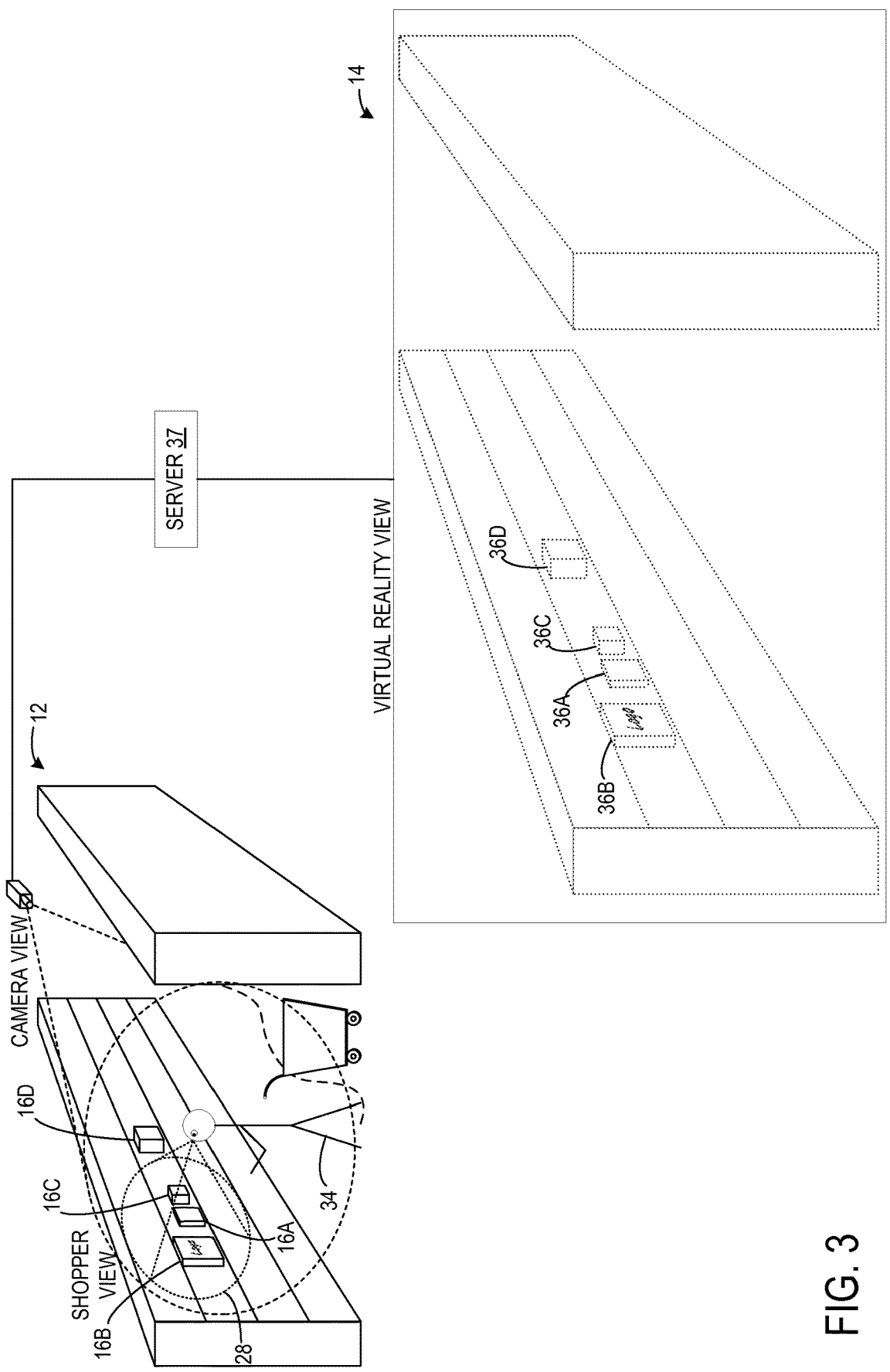
FIG. 3 shows a three-dimensional virtual reality model corresponding to the shopping environment.

FIG. 3 shows the 3-D virtual reality model 14 corresponding to the shopping environment 12. In the shopping environment 12, a shopper 34 may be looking at a product 16A. Products 16B and 16C may also be within the estimated field of view 28 of the shopper 34. Additionally, a product 16D may be outside the estimated field of view 28. The estimated field of view 28 is represented here as a probability ellipse with a point of focus at the line of sight of the shopper, forming an elliptical cone, but it may also be a circular cone, two merged cones, a pyramid, a flat-top cone, etc. The process of determining the point of focus is described in U.S. patent application Ser. No. 12/135,092, filed Jun. 6, 2008, and entitled "SHOPPER VIEW TRACKING AND ANALYSIS SYSTEM AND METHOD," the entirety of which is herein incorporated by reference.

Products 16A-D may each have a respective product location, for instance, latitude, longitude, and altitude coordinates. In the 3-D model 14, virtual products 36A-D may correspond to the products 16A-D of the shopping environment 12 such that the product locations are associated with and retrievable from the 3-D model 14. By comparing the product locations of virtual products 36A-D, and thus of the products 16A-D, with the estimated field of view 28, products 16A-C may be determined to exist within the field of view 28, while product 16D may be determined to not exist within the field of view 28.

The 3-D model 14 may be developed using planogram data, which is data indicating the X, Y, and Z position for each product on each shelf in the store. However, the retailer, etc. may not have such data. Alternatively, the 3-D model 14 may be developed using images from image capture devices such as the cameras 18 or a high resolution camera with a fisheye lens. For example, one or more cameras may be placed or carried throughout various parts of the shopping environment 12 to record video or capture still images of the shopping environment 12. Environment images (i.e. frames of the video or the still images) may then be stitched together to form the 3-D model 14, for example by identifying common features in adjacent environment images. Alternatively, the environment images may be left separate from one another. In FIG. 3, environment images are collected on a server 37, which may be the analysis computing device 24 or another type of computing device, which then are used to generate the 3-D model 14. The product locations may be manually added to the 3-D model 14, or object recognition may be used to determine the product locations from the environment images. The 3-D model 14 may become the pinned model 14A of FIG. 1 when data is "pinned" to it. The data may be any type of data, including text, images, and video. Data may be timestamped and pinned to a point in 3-D space such that any datum may have coordinates in three dimensions of space as well as a time and at least one more piece of information. For instance, the other piece of information may be that the product 16A at that object location at that time was in a shopper's field of view 28.

Figure 4:
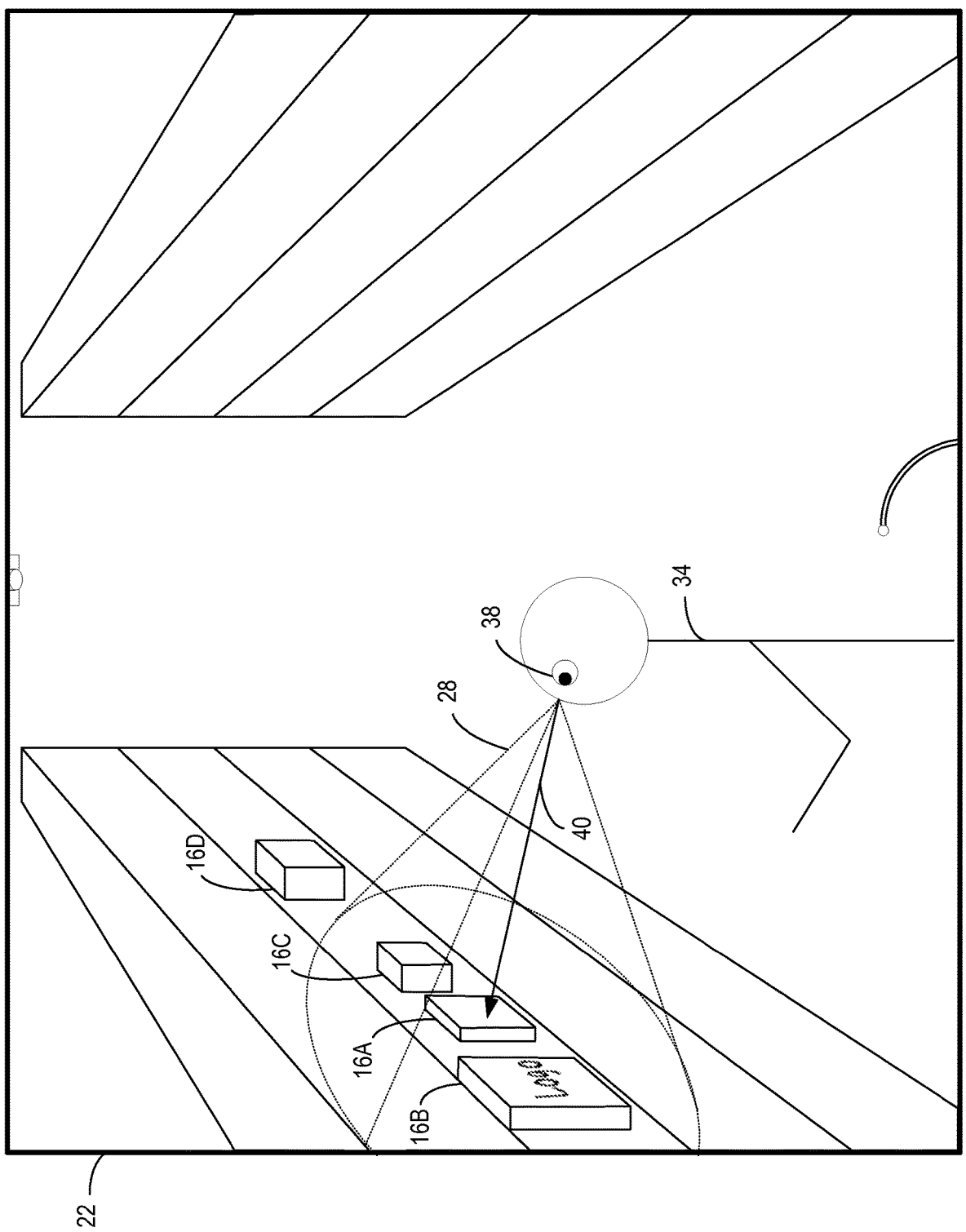
FIG. 4 shows an image of the shopper with an estimated field of view.

FIG. 4 shows the image 22 of the shopper 34 with the estimated field of view 28. The analysis program 26 of FIG. 1 may be configured to compute the estimated field of view 28 by using computer vision techniques to determine a location of one or more facial features 38 in the plurality of images 22, indicating a face of the shopper 34. The computer vision techniques may include facial recognition, for example. The facial feature 38 is depicted here as an eye, but many features 38 are possible, including a nose, cheekbone, ear, mouth, and jaw. Multiple features 38 may be used in combination, for example two eyes or two eyes and a mouth.

The analysis program 26 may be configured to determine a head pose 40 based on the location of the one or more facial features 38. The head pose 40 may include both a position and orientation of the shopper's head. The field of view 28 may be aligned with the head pose 40 such that the head pose 40 is central within the field of view 28, and the analysis program 26 may be configured to assign the estimated field of view 28 based on the head pose 40. This approach may assume that the shopper 34 is looking straight forward, aligned with the head pose 40, and not moving his eyes relative to his head for a significant period of time. Further, the visibility metric may be more heavily weighted toward instances where the product is located more centrally (i.e. near to the head pose) than toward the fringe of the estimated field of view. This may take into account the assumption that shoppers may not pay as close attention to objects which they are not directly facing.

Individual shoppers 34 may be tracked throughout the shopping environment 12 and may optionally be identified through facial recognition. In this manner, actions of the shopper 34 may be correlated to one another. Due to privacy concerns, a recognized shopper may be assigned an anonymized data token that enables unique identification of the shopper without associating any personally identifiable information with the shopper 34. Alternatively or additionally, participation may be voluntary and the shopper may "opt-in" to participate in the shopping analysis. The shopper's actions, including visits, shops, and purchases, may be associated with the shopper 34 and then the various outputs 30 of the system 10 of FIG. 1 may be calculated for the shopper 34. For example, the visibility metric may comprise an amount or percentage of time that a specific product is visible by the shopper. The visibility metric may include a moving field of vision or a moving point of focus, and the entire shopping trip may be tracked in this manner. The shopper's entire body may be tracked as well, including posture, arm position, etc. Further, data per shopper may be aggregated and analyzed for multiple or all shoppers in the shopping environment or multiple shopping environments. For example, the visibility metric may comprise an average amount (e.g. seconds) or percentage of time that the product lies within the field of view of each shopper, or a percentage of shoppers having the field of view in which the product lies.

The visibility metric may be based on a product, brand, department, shopping region, display, etc. For instance, a manufacturer may wish to know for how many seconds their logo is visible to an average shopper in a store, across all products they manufacture. Further analysis may include determining how far into a shopping trip the product is retrieved for purchasing, on average (e.g. the first 10% or two minutes), or how often a product is retrieved from one product location compared to another. Additionally, comparable products of different brands may analyzed, for example that Brand A's facial tissues are twice as visible as Brand B's tissues.

Figure 5:
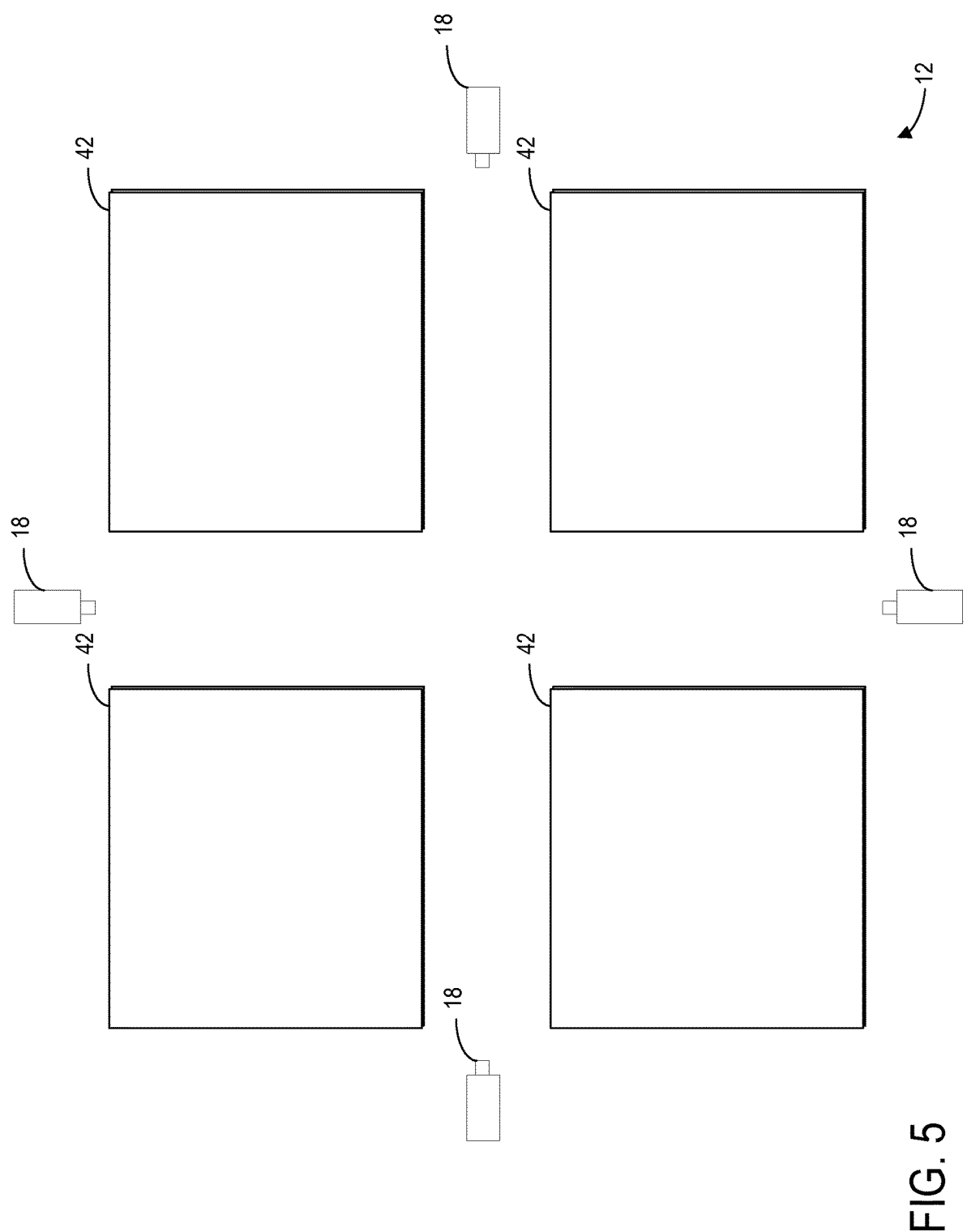
FIG. 5 shows the shopping environment according to another implementation.

FIG. 5 shows the shopping environment 12 according to another implementation. Many product arrangements are possible beyond the aisle arrangement shown in FIG. 1. In FIG. 5, the products are displayed in blocks 42, which may be tables, shelves, etc. for displaying products. In order to capture images between blocks 42, an opposing pair of cameras 18 may each be placed outside of the spaces between two blocks. The shopping environment 12 may not be limited to any particular arrangement or type.

Figure 6:
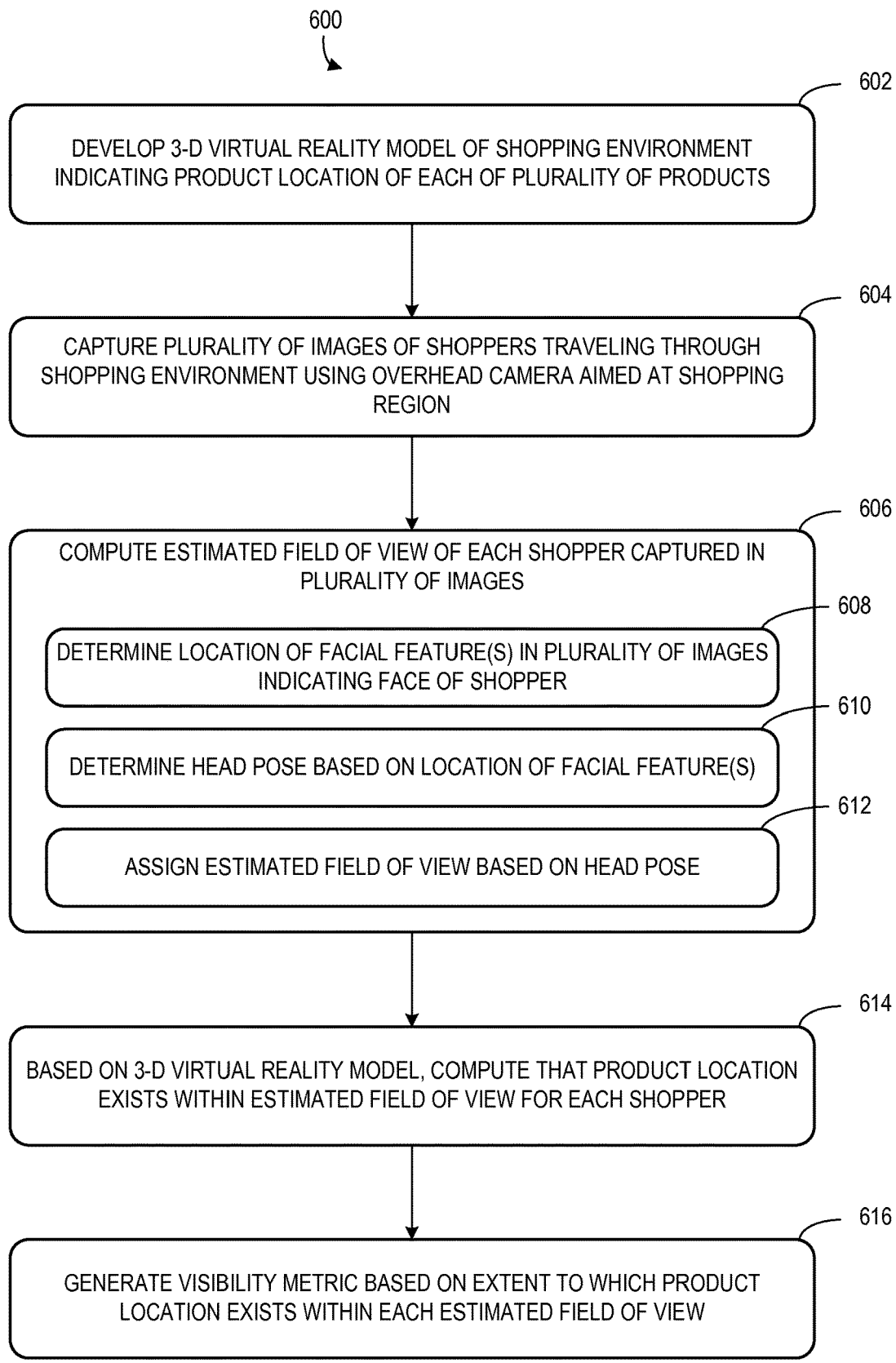
FIG. 6 illustrates a flowchart of a method for analyzing product exposure to one or more shoppers in the shopping environment.

FIG. 6 illustrates a flowchart of a method 600 for analyzing product exposure to one or more shopper(s) in a shopping environment. The following description of method 600 is provided with reference to the various components of the system 10 described above and shown in FIG. 1. It will be appreciated that method 600 may also be performed in other contexts using other suitable hardware and software components.

With reference to FIG. 6, at 602, the method 600 may include developing a three-dimensional (3-D) virtual reality model of the shopping environment indicating a product location of each of a plurality of products. As described above, the 3-D model may be developed using planogram data or may be stitched together from images of the shopping environment from image capture devices. The virtual reality model may be of each shopper's trip, or it may be an aggregate model of the trips of a crowd of shoppers. At 604, the method 600 may include capturing a plurality of images of shoppers traveling through the shopping environment using an overhead camera aimed at a shopping region. One camera may be used or multiple cameras may be used in a variety of arrangements. It is preferable that sufficient cameras are used to have at least one camera capturing images of the shopper at any time, and it is more preferable that the shopper's face is visible to at least one camera.

At 606, the method 600 may include computing an estimated field of view of each shopper captured in the plurality of images. At 608, the method 600 may include using computer vision techniques to determine a location of at least one facial feature in the plurality of images, indicating a face of the shopper. The computer vision techniques may comprise facial recognition. Multiple facial features may be detected and the face may be indicated by a combination of facial features, such as two eyes, two eyes and a mouth, or a nose, cheekbones, and a jaw, for example. At 610, the method 600 may include determining a head pose based on the location of the facial feature. The head pose may comprise a head orientation and a head position. As an alternative to solely tracking the shopper's head, the shopper's full skeleton may be tracked. This may provide more information than just head pose, including posture and arm position, for example. This may help the system track when a shopper reaches out and touches a particular product, for example. In this regard the system may be configured to recognize predetermined poses or gestures through skeletal tracking in proximity to products or fixtures within the shopping environment, and may record statistics thereon. At 612, the method 600 may include assigning the estimated field of view based on the head pose. The estimated field of view may be assigned such that it is aligned with and centered around the head pose. In this manner, an object on which a shopper is focusing may be positioned in front of the shopper's face, but nearby objects may still lie within the field of view.

At 614, the method 600 may include, based on the 3-D virtual reality model, computing that a product location exists within the estimated field of view for each shopper. As above, the computation may include comparing the product locations in the 3-D model with the estimated field of view. At 616, the method 600 may include generating a visibility metric based on an extent to which the product location exists within each estimated field of view. The visibility metric may comprise or be used to produce an amount or percentage of time that a specific product is visible by one specific shopper, an average amount (e.g. seconds) or percentage of time that the product lies within the field of view of each shopper, or a percentage of shoppers having the field of view in which the product lies, among other possibilities.

The output 30 of FIG. 1, as mentioned above, may be a report 30, giving the X, Y, Z coordinates T (time), O (head pose orientation) annotated with the object (products, shoppers, fixtures, etc.) at the location within the field of view of the shopper. The report 30 may be an organized list of visibility metrics 32 and other computed values, which may include aggregated data of all shoppers 34, and even for more than one shopping environment 12. The report may be viewable by a third party, for instance the manager of the shopping environment 12 or a representative of a brand of products 16 sold at the shopping environment 12. However, the output 30 may include a great amount of data, considering that the shopping environment 12 may be monitored over time and data may be recorded at frequent intervals. Therefore, as an alternative or in addition to a written report, the pinned model 14A may be used to present various outputs 30, described above, in a third party view.

Figure 7:
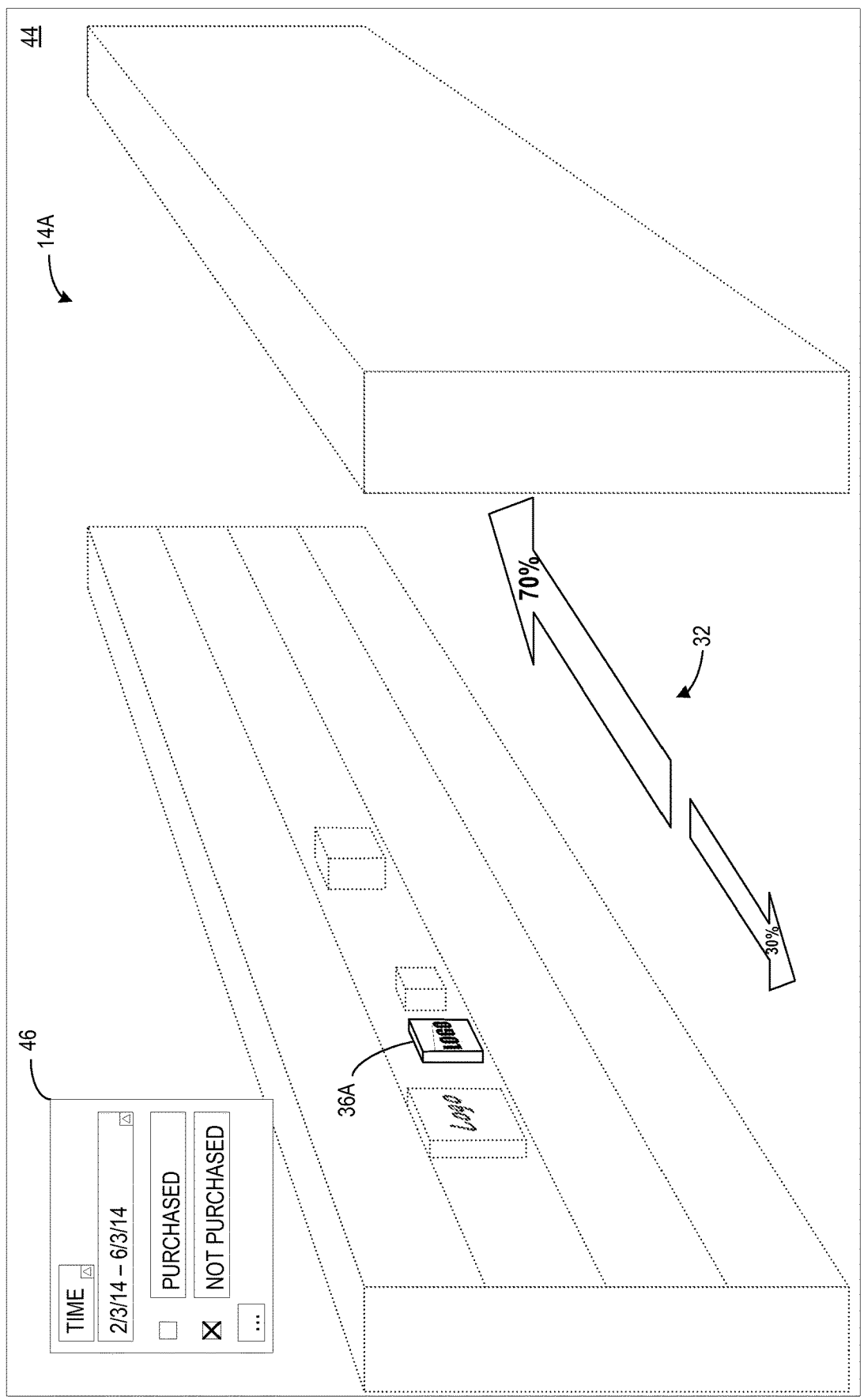
FIG. 7 illustrates an example third party view of an output of the system.

FIG. 7 illustrates an example third party view of the output 30 of the system 10. In addition to the third party view, a third party may search and analyze raw data. The third party view may be displayed on a display device of the analysis computing device 24 or a third party computing device of any suitable type. A graphical user interface (GUI) 44 for a user to interact with the third party view may include the pinned model 14A, which may have an aisle with products on shelves or other suitable product configuration. Product 36A may be selected by the user via a suitable input device such as a mouse, touch screen, keyboard, etc. Parameter selector 46 may allow the user to input or select various parameters or options such as a time period, whether the selected product 36A was purchased or not purchased, the specific product 36A or entire brand, type of product, shopping region 20, various shopping environments 12, and which visibility metric 32 or other data of output 30 is to be displayed. Some parameters or options may be hidden and accessed by selecting a button labeled " . . . " to avoid cluttering the GUI 44.

In the example of FIG. 7, the user may navigate the GUI 44 to select product 36A, a time period (e.g. Feb. 3, 2014 to Jun. 3, 2014), and a parameter (e.g. the option "not purchased"). The analysis computing device 24 or third party computing device may then use the data pinned to the pinned model 14A to calculate the visibility metric 32 indicated in the parameter selector 46. For instance, the visibility metric 32 presented in the third party view may be what percentage of shoppers, between Feb. 3, 2014 and Jun. 3, 2014, after having the selected product 36A within their field of view, then moved in which direction before eventually leaving the shopping environment 12 without purchasing the product 36A. The visibility metric 32 may be displayed as text, charts, arrows, etc. For example, the visibility metric 32 may be displayed as two arrows of differing sizes indicating that 70% of shoppers proceeded to the right of product 36A and 30% to the left.

Thus, according to the system and method for analyzing product exposure to shoppers in a shopping environment described above, which products are positioned within the field of view of the shoppers may be estimated in an accurate and cost-effective manner. Manufacturers or retailers may use the analysis to adjust marketing strategies and increase revenue. It will be appreciated that the above system not only may allow a user to virtually navigate a shopping environment and view the locations of products on shelves, but the user may actually visually inspect the pinned data generated by image capture taken place in a real store (or plurality of stores and normalized to the virtual model). Thus, dominant shopper flows, purchasing patterns, etc. may be graphically inspected within the environment. When data is normalized, despite having differences in architecture between stores, stores can be simplified into a basic layout with common features so that comparisons may be more easily drawn. Further, the user can simulate the effect of moving products within the environment, by selecting a product and moving it to a different location within the model, and then running queries to produce estimates of various data parameters for the product in the new location based on the pinned data set. For example, the exposure of the product within actual shopper fields of view may be estimated.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for analyzing product exposure to one or more shoppers in a physical shopping environment, the method comprising:
at a processor of a computing device:
developing a three-dimensional virtual reality model of the physical shopping environment using planogram data indicating a product location in the physical shopping environment of each of a plurality of products, and storing the model in non-volatile memory associated with the processor of the computing device;
receiving a plurality of images of shoppers traveling through the physical shopping environment captured via at least two overhead cameras aimed at a shopping region, wherein the at least two overhead cameras include:
a first overhead camera located on a first side of the shopping region; and
a second overhead camera located on a second side of the shopping region, wherein the second side is opposite the first side, and wherein each of the shoppers within the shopping region is captured by both the first and the second overhead cameras so that a face of each shopper within the shopping region is visible to at least one of the first and second overhead cameras;
computing an estimated field of view of each shopper within the shopping region captured in the plurality of images by:
determining a location of a facial feature in the plurality of images, wherein the facial feature includes one or more eyes of a shopper, indicating the face of the shopper;
determining a head pose based on the location of the facial feature, the head pose including a position and an orientation; and
assigning the estimated field of view based on the position and the orientation of the head pose in which the estimated field of view defines a three-dimensional volume or region of the physical shopping environment that is aligned with and surrounds the head pose, wherein the estimated field of view has a shape selected from the group consisting of elliptical cone, circular cone, two merged cones, a pyramid, and a flat-top cone;
based on the three-dimensional virtual reality model, computing that a product location associated with a target product is within the estimated field of view for each shopper; and
generating a visibility metric for the target product at the product location based on an extent to which the product location exists within each estimated field of view,
wherein the visibility metric includes an average amount of time in which the product location associated with the target product lies within the estimated field of view of each shopper.

2. The method of claim 1, wherein developing the three-dimensional virtual reality model includes stitching together images of the physical shopping environment from image capture devices.

3. A system for analyzing product exposure to one or more shoppers in a physical shopping environment, the system comprising an analysis computing device including a processor and associated non-volatile memory, the processor being configured to:
develop a three-dimensional virtual reality model of the physical shopping environment using planogram data indicating a product location in the physical shopping environment of each of a plurality of products, and storing the model in non-volatile memory;
receive a plurality of images of shoppers traveling through the physical shopping environment captured by at least two overhead cameras aimed at a shopping region, wherein the at least two overhead cameras include:
a first overhead camera located on a first side of the shopping region; and
a second overhead camera located on a second side of the shopping region, wherein the second side is opposite the first side, and wherein each of the shoppers within the shopping region is captured by both the first and the second overhead cameras so that a face of each shopper within the shopping region is visible to at least one of the first and second overhead cameras;

compute an estimated field of view of each shopper within the shopping region captured in the plurality of images by:
    determining a location of a facial feature in the plurality of images wherein the facial feature includes one or more eyes of a shopper, indicating the face of the shopper;
    determining a head pose based on the location of the facial feature, the head pose including a position and an orientation; and
    assigning the estimated field of view based on the position and the orientation of the head pose in which the estimated field of view defines a three-dimensional volume or region in the physical shopping environment that is aligned with and surrounds the head pose, wherein the estimated field of view has a shape selected from the group consisting of elliptical cone, circular cone, two merged cones, a pyramid, and a flat-top cone;
based on the three-dimensional virtual reality model, compute that a product location associated with a target product is within the estimated field of view for each shopper; and
generate a visibility metric for the target product at the product location based on an extent to which the product location exists within each estimated field of view,
wherein the visibility metric includes an average amount of time in which the product location associated with the target product lies within the estimated field of view of each shopper.

4. The system of claim 3, wherein the three-dimensional virtual reality model is developed by stitching together images of the physical shopping environment from image capture devices.

5. A method for analyzing product exposure to one or more shoppers in a physical shopping environment, the method comprising:
    at a processor of a computing device:
        developing a three-dimensional virtual reality model of the physical shopping environment using planogram data indicating a product location in the physical shopping environment of each of a plurality of products, and storing the model in non-volatile memory associated with the processor of the computing device;
        receiving a plurality of images of shoppers traveling through the physical shopping environment captured via at least two overhead cameras aimed at a shopping region, wherein the at least two overhead cameras include:
            a first overhead camera located on a first side of the shopping region; and
            a second overhead camera located on a second side of the shopping region, wherein the second side is opposite the first side, and wherein each of the shoppers within the shopping region is captured by both the first and the second overhead cameras so that a face of each shopper within the shopping region is visible to at least one of the first and second overhead cameras;
        computing an estimated field of view of each shopper within the shopping region captured in the plurality of images by:
            determining a location of a facial feature in the plurality of images wherein the facial feature includes one or more eyes of a shopper, indicating the face of the shopper;
            determining a head pose based on the location of the facial feature, the head pose including a position and an orientation; and
            assigning the estimated field of view based on the position and the orientation of the head pose in which the estimated field of view defines a three-dimensional volume or region of the physical shopping environment that is aligned with and surrounds the head pose, wherein the estimated field of view has a shape selected from the group consisting of elliptical cone, circular cone, two merged cones, a pyramid, and a flat-top cone;
        based on the three-dimensional virtual reality model, computing that a product location associated with a target product is within the estimated field of view for each shopper; and
        generating a visibility metric for the target product at the product location based on an extent to which the product location exists within each estimated field of view,
    wherein the visibility metric includes a percentage of shoppers having the estimated field of view in which the product location associated with the target product lies.

6. A system for analyzing product exposure to one or more shoppers in a physical shopping environment, the system comprising an analysis computing device including a processor and associated non-volatile memory, the processor being configured to:
    develop a three-dimensional virtual reality model of the physical shopping environment using planogram data indicating a product location in the physical shopping environment of each of a plurality of products, and storing the model in non-volatile memory;
    receive a plurality of images of shoppers traveling through the physical shopping environment captured by at least two overhead cameras aimed at a shopping region, wherein the at least two overhead cameras include:
        a first overhead camera located on a first side of the shopping region; and
        a second overhead camera located on a second side of the shopping region, wherein the second side is opposite the first side, and wherein each of the shoppers within the shopping region is captured by both the first and the second overhead cameras so that a face of each shopper within the shopping region is visible to at least one of the first and second overhead cameras;
    compute an estimated field of view of each shopper within the shopping region captured in the plurality of images by:
        determining a location of a facial feature in the plurality of images wherein the facial feature includes one or more eyes of a shopper, indicating the face of the shopper;
        determining a head pose based on the location of the facial feature, the head pose including a position and an orientation; and
        assigning the estimated field of view based on the position and the orientation of the head pose in which the estimated field of view defines a three-dimensional volume or region of the physical shopping environment that is aligned with and surrounds the head pose, wherein the estimated field of view has a shape selected from the group consisting of elliptical cone, circular cone, two merged cones, a pyramid, and a flat-top cone;

based on the three-dimensional virtual reality model, compute that a product location associated with a target product is within the estimated field of view for each shopper; and generate a visibility metric for the target product at the product location based on an extent to which the product location exists within each estimated field of view, wherein the visibility metric includes a percentage of shoppers having the estimated field of view in which the product location associated with the target product lies.

7. The method of claim 1, further comprising:

weighting the visibility metric for the target product in which the visibility metric has a greater weighting if the target product is located closer to the head pose and the visibility metric has a lesser weighting if the target product is located further from the head pose.

8. The method of claim 1, further comprising:

weighting the visibility metric for the target product in which the visibility metric has a greater weighting if the target product is located closer to a center of the volume or region of the estimated field of view and the visibility metric has a lesser weighting if the target product is located further from the center of the volume or region of the estimated field of view.

9. The system of claim 3, wherein the processor is further configured to:

weight the visibility metric for the target product in which the visibility metric has a greater weighting if the target product is located closer to the head pose and the visibility metric has a lesser weighting if the target product is located further from the head pose.

10. The system of claim 3, wherein the processor is further configured to:

weight the visibility metric for the target product in which the visibility metric has a greater weighting if the target product is located closer to a center of the volume or region of the estimated field of view and the visibility metric has a lesser weighting if the target product is located further from the center of the volume or region of the estimated field of view.

11. The method of claim 5, further comprising:

weighting the visibility metric for the target product in which the visibility metric has a greater weighting if the target product is located closer to the head pose and the visibility metric has a lesser weighting if the target product is located further from the head pose.

12. The method of claim 5, further comprising:

weighting the visibility metric for the target product in which the visibility metric has a greater weighting if the target product is located closer to a center of the volume or region of the estimated field of view and the visibility metric has a lesser weighting if the target product is located further from the center of the volume or region of the estimated field of view.

13. The system of claim 6, wherein the processor is further configured to:

weight the visibility metric for the target product in which the visibility metric has a greater weighting if the target product is located closer to the head pose and the visibility metric has a lesser weighting if the target product is located further from the head pose.

14. The system of claim 6, wherein the processor is further configured to:

weight the visibility metric for the target product in which the visibility metric has a greater weighting if the target product is located closer to a center of the volume or region of the estimated field of view and the visibility metric has a lesser weighting if the target product is located further from the center of the volume or region of the estimated field of view.

* * * * *